July 31, 1962

A. R. MENTER ET AL 3,046,657

PROTECTIVE COVERING FOR BOVINE TEETH AND
PROCESS OF APPLYING SAME

Filed Feb. 20, 1959

INVENTORS
A. ROOD MENTER
BY WARD C. NEWCOMB

Burton & Parker

ATTORNEYS

United States Patent Office 3,046,657
Patented July 31, 1962

3,046,657
PROTECTIVE COVERING FOR BOVINE TEETH
AND PROCESS OF APPLYING SAME
Albion Rood Menter, % Cottonwood Ranch Co., Sedgwick, Colo., and Ward C. Newcomb, P.O. Box 1002, Chappell, Nebr.
Filed Feb. 20, 1959, Ser. No. 794,613
5 Claims. (Cl. 32—12)

This invention relates to a process of applying a protective covering to the anterior teeth on the lower jaw of a cow, to such protective covering itself, and to its association with such anterior bovine teeth.

The useful life of a cow depends in large part upon the useful life of the anterior teeth of the animal. A cow possesses only eight teeth on her front lower jaw. The eight baby teeth with which she is born will be entirely replaced by eight permanent teeth by the time she is six years of age. These eight teeth serve to crop the grass upon which the cow feeds. The back upper and lower molars masticate such food. If the animal grazes upon loose, sandy, gritty soil, these anterior eight teeth wear down rapidly. Within a year or two or more the anterior lower teeth of an animal so feeding may have worn down to such an extent that they are called pearlies or gummers.

A pearlie or gummer as a tooth embodies just a small part of the neck of the tooth, and may project only about one-quarter of an inch above the gum. At such point the animal has about reached the end of its useful life, because as a calf producer and a calf feeder she will be unable to obtain enough food to maintain herself in a healthy condition for such purpose. As a consequence she will have to be sold for slaughter or she may die. If the same cow were feeding on land of a different character wherein much less of the loose gritty material was present as, for example, a limestone terrain, such animal might live productively for a much longer period of time.

Applicant has determined that if each of the anterior (or front) eight teeth on the lower jaw of the cow is covered with a suitable crown, such as a stainless steel crown, a substantial length of time may be added to the cow's useful life. Preferably these crowns should be applied to all of the permanent anterior teeth at the time that they have completely emerged. Obviously, however, the useful life of an animal may be substantially prolonged if crowns are applied to less than eight anterior teeth, and even if the crowns are applied to teeth which have been substantially worn, such as pearlies.

Applicant has also discovered that stainless steel crowns may be provided in the proper size to be received over each of the anterior eight teeth on the lower jaw of a cow and that such may be applied thereto without modifying the tooth to receive the crown. A cow's anterior teeth are relatively flexibly supported, and it has been found that such a tooth may be easily manually swung with respect to adjacent teeth sufficiently to facilitate insertion of a crown thereover.

Furthermore, and unlike human teeth or teeth of other domestic animals, such as horses, sheep, or swine, each anterior tooth of a cow is provided with an undercut of a substantial amount. The maximum or mesial distal dimension may be twice the corresponding dimension adjacent to the gum. A crown received over such an undercut tooth therefore may have its neck portion so formed that it can be constricted and drawn up tightly about the undercut portion of the tooth and thereby retain itself upon the tooth against displacement therefrom. This operation of capping all the anterior lower teeth of a cow may be carried out quickly and rapidly and it adds substantially to the useful life of the animal.

A meritorious feature is that such a crown is provided with a skirt portion of sufficient interior dimension to pass over the maximum dimension portion of the tooth, and such skirt portion is sufficiently deformable to be constricted snugly about the undercut portion of the tooth. The excess of skirt metal over that required to embrace the undercut portion of the tooth may be drawn up into a fold and such fold may be bent back against the forward face of the crowned tooth. Because of the undercut and the forward projection of such anterior teeth, such folds can lie against the forward crowned faces of the undercut portions of all of the anterior teeth without irritation of adjacent gum or lip tissue.

A further meritorious feature is that cementitious material which is disposed within the crown between the crown and the tooth filling and sealing the space therebetween, may be held tightly against the tooth by so constricting the skirt of the crown about the undercut portion of the tooth against said cementitious material as to tension the crown against said cementitious material and hold the same under tension during the setting of said material.

A plurality of different sizes of sets of teeth may be provided so that crowns of the desired size to fit the anterior teeth of all cows may be quickly selected.

A further object is the provision of a metal crown upon each of the eight anterior teeth on the lower jaw of a cow which crown is permanently secured and sealed thereto and constricted about the undercut portion of the tooth and which may be quickly and readily received over the tooth and attached thereto.

Other objects and meritorious features will more fully appear from the following specification, claims, and accompanying drawing wherein:

As heretofore set forth, this invention relates to the preservation of the useful life of a cow (and by cow is meant any bovine animal that feeds in the same manner upon grass) by the preservation of the anterior grass-cropping teeth of the animal. As heretofore stated, when the teeth wear down to the stage where they are termed "pearlies" by the rancher, and this depends upon the character of the ground upon which the animal grazes, the useful economic life of the animal is drawing to a close. When the anterior teeth are so worn that the cow will be unable to obtain sufficient food by grazing to maintain it in a healthy condition suitable for the production of calves. It is the purpose of this invention to prolong the useful life of the animal by prolonging the useful life of its anterior lower teeth through providing suitable metal crowns of such a character that they may be quickly applied to the teeth and do not require modification of the teeth for their application and will not interfere but help with normal cropping of food.

The permanent anterior teeth of a cow have usually completely emerged by the sixth year and it is preferred that at such time, following their complete emergence, they be capped with metal crowns as herein set forth. These crowns may be formed of any suitable material. Stainless steel is a suitable material and it is proposed to make use thereof but any other suitable material might be employed. It is believed that sets of crowns differing in size may be provided from which selection can be made for different animals and the crowns inserted upon the teeth and fastened thereto as hereinafter set forth.

Figure 1:
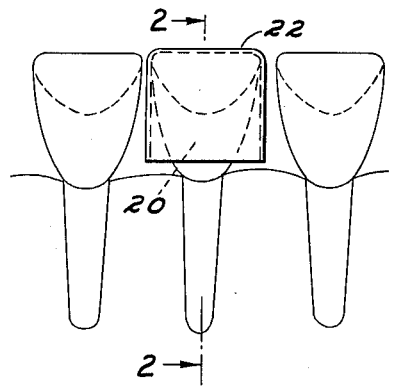
FIG. 1 is an elevation partly in section of three teeth on the anterior portion of the lower jaw of a cow showing the intermediate tooth with a cup-shaped crown of our invention loosely installed thereover.
Figure 2:
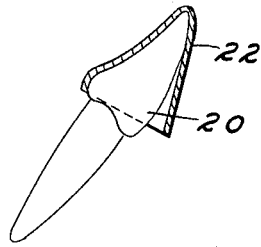
FIG. 2 is a cross sectional view taken on the line 2—2 of FIG. 1.

In FIG. 1 three anterior teeth are shown and each is indicated by the numeral 20. A crown 22 is shown as freely received over one of these teeth. In FIG. 2 such crown is illustrated in cross section. The undercut of an anterior tooth of a cow is substantial as compared with that of any other tooth of the same animal or the front tooth of a human.

The maximum or mesial distal dimension of one of a cow's anterior teeth may be 16 mm. while at a point midway toward the gum it may measure 13.3 mm. and at the neck adjacent to the gum it may measure 7.8 mm. The cup-shaped crowns as herein disclosed must be provided in such size as to be freely receivable over the maximum dimension portion of the teeth. The skirt of the crown at the base must be freely receivable over the maximum dimension portion of the tooth adjacent to the occlusal face of the tooth. When installed over its tooth such crown will be spaced as illustrated in FIGS. 1 and 2 from the undercut portion of the tooth. Preferably, though it is not shown in the drawing, the skirt portion of the crown adjacent to its open end may be of thinner metal than adjacent to the occlusal portion of the crown. This oversize or excess of skirt metal facilitates crimping or constriction of the skirt portion of the crown about the undercut portion of the tooth including folding such excess of metal up on itself as illustrated.

The anterior teeth of a cow are normally spaced further apart than human teeth. The cow's anterior teeth are also flexibly supported by the gum so that with the thumb and finger one may move such a tooth laterally or to one side with respect to adjacent teeth. The normal spacing of the teeth of a six-year old animal wherein the teeth have fully emerged may be from .7 to 1 mm. It is obvious that as the teeth are worn down such as on older animals, the spacing will be substantially greater. It is believed that stainless steel of .3 mm. in thickness will be suitable for the crowns but it is understood that the gauge of the metal may be provided as desired to produce the most satisfactory results.

Figure 3:
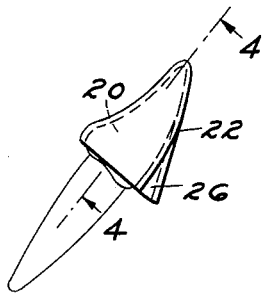
FIG. 3 is a side elevation taken from the same viewpoint as FIG. 2.
Figure 4:
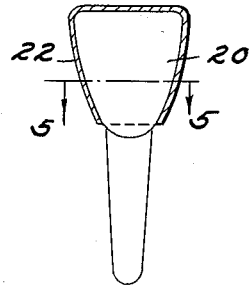
FIG. 4 is a sectional view taken on the line 4—4 of FIG. 3 showing the crown constricted about the neck of the tooth.
Figure 5:
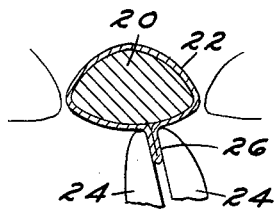
FIG. 5 is a transverse sectional view taken on the line 5—5 of FIG. 4 showing an instrument of the plier type being employed to tighten, fold, and/or crimp the skirt of the crown about the undercut portion of the tooth.

Due to the spacing apart of the anterior teeth and the flexibility of their support, crowns may be readily inserted thereover without grinding away any part of the tooth structure, as is common with human dental work. When a crown has been inserted over its intended tooth as shown in FIG. 3, such crown, adjacent to the open end of the skirt, may then be gripped by the cooperating jaws 24 of a plier-like instrument and drawn up tightly and constricted about the undercut portion of the tooth. This constriction of the skirt of the crown may be so accomplished as to form a fold 26 as shown in FIG. 5 of the drawing.

It is understood that suitable cementitious material will be placed within the crown to form a binder and sealant between the crown and the tooth. Such is shown only in FIGS. 5 and 6 of the drawing and there indicated as 25. It is not otherwise shown because of the thin character of such layer, but it is well understood.

Figure 6:
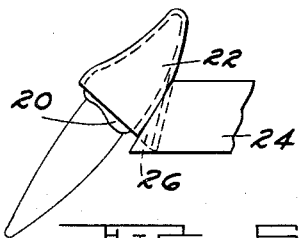
FIG. 6 is a side elevational view of the same operation being shown in FIG. 5.
Figure 7:
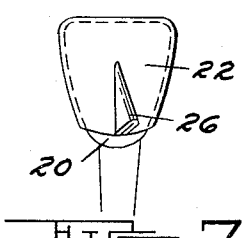
FIG. 7 is a front elevation of the crown inserted upon the tooth and tightened thereabout as shown in FIG. 6.

The use of the plier-like instrument and its cooperating jaws 24 and their character is further shown in FIG. 6. The fold 26 of skirt metal is illustrated particularly in FIGS. 5–10.

Figure 10:
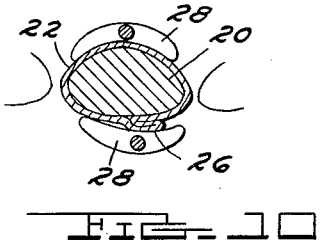
FIG. 10 is a cross sectional view taken on the line 10—10 of FIG. 9 showing a tool in use bending the fold drawn in the skirt of the crown back against the crown.
Figure 9:
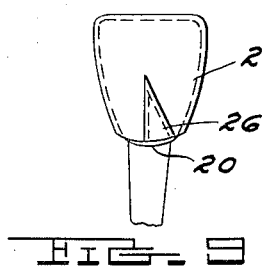
FIG. 9 is a front elevation of the crown shown upon the tooth as illustrated in FIG. 8 with the additional change that a second operation has been applied thereto to bend the fold of the crown back against the crown.
Figure 8:
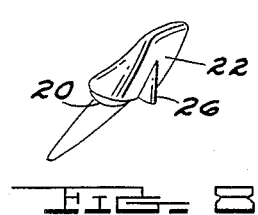
FIG. 8 is a side elevation of the crown shown upon the tooth in front elevation of FIG. 7.

Another plier-like instrument having cooperating jaws 28 may be employed to bend the fold 26 of skirt metal down against the forward face of the undercut portion of the crown of the tooth. This second instrument may have its jaws received lengthwise over the tooth and these jaws are so formed as to engage the crown and flatten the fold down against the tooth as illustrated. FIGS. 9, 10, and 11 show the fold 26 flattened down such as would be the case following the employment of the instrument having the jaws 28. Such fold is flattened down against the forward face of the tooth to lie within the space between the forward face of the tooth and the gum or lip tissue without irritation of such tissue.

When the skirt portion of the crown is constricted about the undercut portion of the tooth and the excess of skirt material is folded together and flattened down against the forward face of the crowned tooth, such constriction tensions the skirt portion of the crown about the cementitious material and holds the same tightly against the tooth. Such cementitious material is therefore held under tension against the tooth during the setting thereof and produces an unusually tight and effective seal and connection between the crown and the tooth. Not only is the crown held tightly about the tooth, but the joint between the crown and the tooth is thoroughly sealed.

What we claim is:

1. The method of applying a crown having a skirt to a bovine tooth having a mesial dimension which decreases from the top of the tooth toward the gum line, which comprises applying cementitious material to the interior of the crown, fitting the crown over the bovine tooth, and crimping the skirt of the crown into a fold between a plane at approximately the mid-height parallel to the top of the crown and the bottom of the skirt to constrict the crown around the tooth.

2. The method of applying a crown having a skirt to a bovine tooth having a mesial dimension which decreases from the top of the tooth toward the gum line, which comprises applying cementitious material to the interior of the crown, fitting the crown over the bovine tooth, crimping the skirt of the crown into a fold between a plane at approximately the mid-height parallel to the top of the tooth and the bottom of the skirt to constrict the crown around the tooth, and bending the fold back against the skirt of the crown.

3. The method of applying a crown having a skirt to a bovine tooth having a mesial dimension which decreases from the top of the tooth toward the gum line, which comprises applying cementitious material to the interior of the crown, fitting the crown over the bovine tooth, crimping the skirt of the crown into a fold between a plane at approximately the mid-height parallel to the top of the crown, and applying pressure to the skirt of the crown over said fold and on the opposite side of the crown from the fold to bend the fold back against the skirt of the crown.

4. A bovine tooth crown comprising a solid top and a skirt having its skirt progressively decreased in cross sectional area from the top of the crown to the bottom of the skirt and a single fold in said skirt between a plane at approxiamtely the mid-height parallel to the top of the crown and the bottom of the skirt.

5. A bovine tooth crown comprising a solid top and a skirt having its skirt progressively decreased in cross sectional area from the top of the crown to the bottom of the skirt and a single fold in said skirt between a plane at approximately the mid-height parallel to the top of the crown and the bottom of the skirt bent back upon the skirt.

References Cited in the file of this patent

UNITED STATES PATENTS

| | | |
|---|---|---|
| 1,609,550 | Jaques | Dec. 7, 1926 |
| 1,670,361 | Johnson | May 22, 1928 |
| 1,828,402 | Geyer | Oct. 20, 1931 |
| 1,916,321 | Jaques | July 4, 1933 |
| 2,790,238 | Trangmar | Apr. 30, 1957 |
| 2,891,313 | Crowley | June 23, 1959 |

FOREIGN PATENTS

| | | |
|---|---|---|
| 831,866 | Germany | Feb. 18, 1952 |